US007707580B2

(12) United States Patent (10) Patent No.: US 7,707,580 B2
Kubota (45) Date of Patent: Apr. 27, 2010

(54) PARALLEL COMPUTING METHOD, PARALLEL COMPUTING PROGRAM AND COMPUTER

(75) Inventor: Kazuto Kubota, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1495 days.

(21) Appl. No.: 11/040,011

(22) Filed: Jan. 24, 2005

(65) Prior Publication Data

US 2005/0183087 A1 Aug. 18, 2005

(30) Foreign Application Priority Data

Jan. 28, 2004 (JP) ............................. 2004-019632
Nov. 11, 2004 (JP) ............................. 2004-327630

(51) Int. Cl.
*G06F 9/46* (2006.01)
(52) U.S. Cl. ........................ 718/105; 718/100; 718/106; 709/208
(58) Field of Classification Search ................ 718/105, 718/100, 106; 709/208
See application file for complete search history.

(56) References Cited

U.S. PATENT DOCUMENTS

| 5,404,516 | A  | * | 4/1995  | Georgiades et al. | 718/104 |
| 5,524,257 | A  | * | 6/1996  | Koike et al.      | 706/10  |
| 6,345,240 | B1 | * | 2/2002  | Havens            | 703/21  |
| 6,434,590 | B1 | * | 8/2002  | Blelloch et al.   | 718/102 |
| 2004/0226013 | A1 | * | 11/2004 | Mariotti et al. | 718/100 |

FOREIGN PATENT DOCUMENTS

| JP | 4-152451    | 5/1992  |
| JP | 7-114520    | 5/1995  |
| JP | 11-85707    | 3/1999  |
| JP | 2001-331461 | 11/2001 |

OTHER PUBLICATIONS

Yaohang Li, et al., "Improving Performance via Computational Replication on a Large-Scale Computational Grid", Proc of 3$^{rd}$ International Symposium on Cluster Computing and the Grid, May 12-15, 2003, pp. 1-7.
Adriana Iamnitchi, et al., "A Problem-Specific Fault-Tolerance Mechanism for Asynchronous, Distributed Systems", Proc of the 2000 International Conference on Parallel Processing, Aug. 2000, 10 Pages.

* cited by examiner

*Primary Examiner*—Andy Ho
(74) *Attorney, Agent, or Firm*—Oblon, Spivak, McClelland, Maier & Neustadt, L.L.P.

(57) ABSTRACT

There is provided a parallel computing method of performing a parallel computing by using a master computer for generating a job and plural worker computers which execute the job and to each of which availability is assigned: wherein the master computer; includes: generating plural jobs each having a value; storing the generated jobs into a job storage; calculating an availability threshold according to order of values of the jobs stored in the job storage for each of the jobs; calculating an availability operation value for the job in the job storage by using availability of a worker computer executing the job; throwing a job whose availability operation value is less than the availability threshold to a worker computer which is available; receiving a result of execution of the job from the worker computer; and deleting the received job from the job storage.

10 Claims, 16 Drawing Sheets

D1(x11,x12,x13,y1)
D2(x21,x22,x23,y2)
D3(x31,x32,x33,y3)
D4(x41,x42,x43,y4)
D5(x51,x52,x53,y5)
D6(x61,x62,x63,y6)

PARALLEL COMPUTING METHOD, PARALLEL COMPUTING PROGRAM AND COMPUTER

CROSS-REFERENCE TO RELATED APPLICATIONS

This application claims the benefit of priority under 35 USC §119 to Japanese Patent Application No. 2004-19632 filed on Jan. 28, 2004 and No. 2004-327630 filed on Nov. 11, 2004, the entire contents of which are incorporated herein by reference herein.

BACKGROUND OF THE INVENTION

1. Field of the Invention

The present invention relates to a parallel computing method, a parallel computing program and computer for processing plural jobs in parallel by using a master-worker type computer system. More specifically, the invention relates to a parallel computing method and a parallel computing program and computer enabling computation to be continued without conspicuously deteriorating execution performance even in the case where part of computers becomes heavily loaded or defective for some reason.

2. Related Art

As a method of preventing processing speed from decreasing in the case where plural computers for processing jobs in parallel exist, there is a method called load balancing. In the load balancing, the amount of jobs assigned to a heavily-loaded computer is reduced and the jobs are assigned to other computers, thereby equalizing the loads and preventing decrease in processing speed.

In the parallel computation using the load balancing, there is a case such that the load on a specific computer dynamically changes due to an external factor during execution of a job and, for example, increases. If increase in the load on the specific computer during execution of the job is known before execution of the job, by decreasing jobs to the specific computer and assigning the jobs to other computers, increase in the load can be suppressed. It is however generally difficult to predict fluctuations in loads and therefore difficult to properly allocate jobs. Therefore, when the load on a computer increases due to an external factor during parallel computation, a problem occurs such that finishing of the job in the computer delays and, as a result, the processing speed of the whole parallel computation decreases.

On the other hand, in the parallel computation using load balancing, there are not only the case where the load on part of computers becomes heavy, but also a case where a computer stops due to a failure during execution of a job.

There are roughly the following three methods as methods of dealing with the case where a computer stops due to a failure.

As the first method, spare hardware is prepared to obtain fault tolerant feature. For example, there is a method of constructing a system by using duplicated hardware performing the same operation and a comparator in order to deal with a failure. In the method, however, the configuration of the hardware becomes large-scaled and the cost increases.

As the second method, middleware is allowed to run in each of computers to thereby provide fault tolerance. For example, there is a method of using the techniques of check pointing and migration as basic techniques for realizing fault tolerance. The check pointing is a technique of storing an execution image of a job at a certain time point. The migration is a function of migrating the stored execution image to another computer and re-executing calculation. Both of the computers store the execution image, and a job of the computer which is down is executed by another computer, thereby preventing parallel computation from being interrupted. It is, however, exaggerated to provide all of computers with the middleware performing such check pointing and migration and a problem arises such that periodical check pointing creates excessive overhead in execution of a job. In the method, the job is re-executed at the time point when a failure is found, so that execution performance of the parallel process is much lower than that in the case where there is no failure.

In the third method, all of jobs are multiplexed and executed. In the method, however, the number of jobs increases only by the amount of multiplexing. For example, in the case of duplicating a job, the number of jobs is doubled.

As described above, conventionally, it is difficult to prevent the overall processing speed from decreasing in the case where the load on part of computers increases during parallel process or part of computers stops.

BRIEF SUMMARY OF THE INVENTION

According to a first aspect of the present invention, there is provided a parallel computing method of performing a parallel computing by using a master computer for generating a job and plural worker computers which execute the job and return an execution result of the job to the master computer and to each of which availability is assigned: wherein the master computer; includes: generating plural jobs each having a value; storing the generated jobs into a job storage; calculating an availability threshold according to order of values of the jobs stored in the job storage for each of the jobs; calculating an availability operation value for the job in the job storage by using availability of a worker computer executing the job; throwing a job whose availability operation value is less than the availability threshold to a worker computer which is available; receiving a result of execution of the job from the worker computer; and deleting the received job from the job storage.

According to a second aspect of the present invention, there is provided a parallel computing method of performing a parallel computing by using a master computer for generating a job and plural worker computers for executing the job and returning a result of the execution to the master computer: wherein the master computer; includes: generating plural jobs; throwing the generated jobs to the worker computers; collecting a result of execution of the job from the worker computer; and determining whether collection of results of execution of the job is finished or not on the basis of a predetermined collection finishing condition.

According to a third aspect of the present invention, there is provided a parallel computing method of performing a parallel computing by using a master computer for generating a job and plural worker computers for executing the job and returning a result of the execution of the job to the master computer: wherein the master computer; includes: generating plural jobs each having a value; calculating multiplicity of each of the jobs on the basis of the value of the job; throwing the job to the worker computer in accordance with the corresponding multiplicity; collecting a result of execution of the job from the worker computer; and determining whether collection of results of execution of the job is finished or not on the basis of a predetermined collection finishing condition.

According to a fourth aspect of the present invention, there is provided a parallel computing program executed by a master computer of a system performing a parallel computing by using the master computer for generating a job and plural worker computers which execute the job and return an execution result of the job to the master computer and to each of which availability is assigned, comprising: generating plural jobs each having a value; storing the generated jobs into a job storage; calculating an availability threshold according to order of values of the jobs stored in the job storage for each of the jobs; calculating an availability operation value for the job in the job storage by using availability of a worker computer executing the job; throwing a job whose availability operation value is less than the availability threshold to a worker computer which is available; receiving a result of execution of the job from the worker computer; and deleting the received job from the job storage.

According to a fifth aspect of the present invention, there is provided a parallel computing program executed by a master computer of a system performing a parallel computing by using the master computer for generating a job and plural worker computers which execute the job and return an execution result of the job to the master computer, comprising: generating plural jobs; throwing the generated jobs to the worker computers; collecting a result of execution of the job from the worker computer; and determining whether collection of results of execution of the job is finished or not on the basis of a predetermined collection finishing condition.

According to a sixth aspect of the present invention, there is provided a parallel computing program executed by a master computer of a system performing a parallel computing by using the master computer for generating a job and plural worker computers which execute the job and return an execution result of the job to the master computer, comprising: generating plural jobs each having a value; calculating multiplicity of each of the jobs on the basis of the value of the job; throwing the job to the worker computer in accordance with the corresponding multiplicity; collecting a result of execution of the job from the worker computer; and determining whether collection of results of execution of the job is finished or not on the basis of a predetermined collection finishing condition.

According to a seventh aspect of the present invention, there is provided a computer for throwing jobs to plural worker computers and receiving execution results of the jobs from the worker computers, comprising: a job generating unit generating plural jobs each having a value; a job storage storing the generated jobs; an availability threshold calculating unit calculating an availability threshold according to order of values of the jobs stored in the job storage for each of the jobs; an availability storage storing availability assigned to each of the worker computers; an availability operation value calculating unit calculating an availability operation value for the job in the job storage by using availability of a worker computer executing the job; and a job management unit throwing a job whose availability operation value is less than the availability threshold to a worker computer which is available and in case of receiving a result of execution of the job from the worker computer, deleting the received job from the job storage.

According to an eighth aspect of the present invention, there is provided a computer for throwing jobs to plural worker computers and receiving execution results of the jobs from the worker computers, comprising: a job generating unit generating plural jobs; a job collecting unit throwing the generated jobs to the worker computers and collecting a result of execution of the job from the worker computer; and a determining unit whether collection of results of execution of the job is finished or not on the basis of a predetermined collection finishing condition.

According to a ninth aspect of the present invention, there is provided a computer for throwing jobs to plural worker computers and receiving execution results of the jobs from the worker computers, comprising: a job generating unit generating plural jobs each having a value; a job multiplexing unit calculating multiplicity of each of the jobs on the basis of the value of the job; a job result collecting unit throwing the job to the worker computer in accordance with the corresponding multiplicity and collecting result of execution of the job from the worker computer; and a determining unit determining whether collection of results of execution of the job is finished or not on the basis of a predetermined collection finishing condition.

DETAILED DESCRIPTION OF THE INVENTION

First Embodiment

Figure 1:
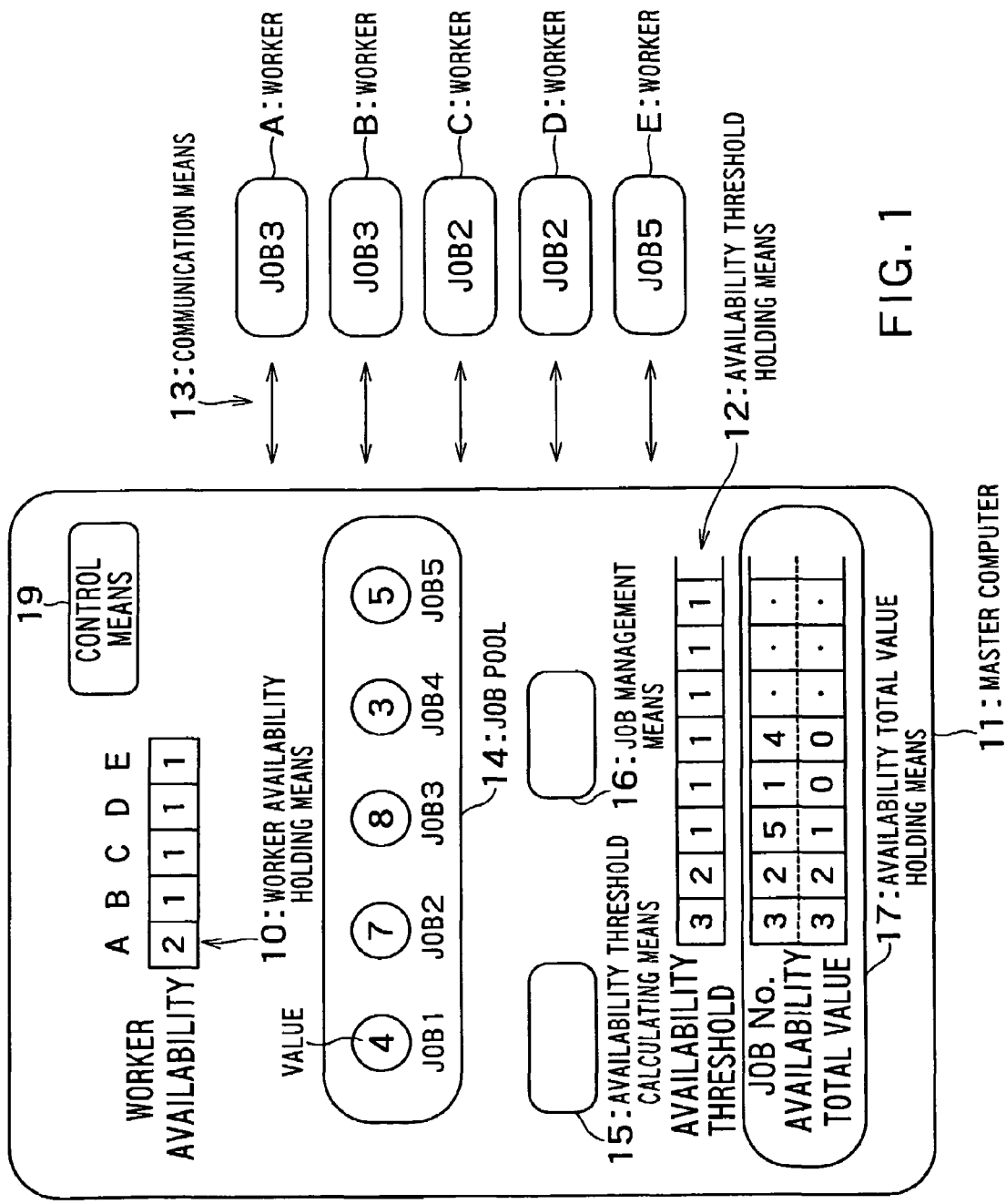
FIG. 1 is a diagram showing a basic configuration of a computer system for executing a parallel processing method as a first embodiment of the invention.

FIG. 1 is a diagram showing a basic configuration of a computer system for executing a parallel processing method as a first embodiment of the invention.

The basic configuration and operation of the computer system will be described below and, after that, a concrete application example of the computer system will be described.

As shown in FIG. 1, the computer system has a master computer 11 performing generation, management, and the like of jobs and workers A to E for executing a job given from the master computer 11 and returning a result of the execution (job result).

A job pool (job storage) 14 in the master computer 11 stores jobs generated by the master computer 11. Each job is distinguished by a number and has a value. In the example, jobs 1 to 5 are stored in the job pool 14. The job 1 has value 4, the job 2 has value 7, the job 3 has value 8, the job 4 has value 3, and the job 5 has value 5.

Worker availability holding means 10 in the master computer 11 stores an availability assigned to each worker. The availability is, for example, computation power or reliability.

Availability total value holding means 17 has means which holds job numbers and means which holds availability total values (availability operation value).

The number of a job in the job pool 14 is input to the means which holds job numbers. The job numbers are arranged so that values of the jobs are in descending order from left.

To the means which holds an availability total value, a result of computation using the availability of a worker executing the job is input. The computation may be addition or calculation by a function using the availability of a worker and job execution time. In this case, a result of addition of availability of a worker will be called an availability total value.

For example, the reason why the availability total value of the job 3 is 3 is because the availability of the workers A and B executing the job 3 is 2 and 1, respectively. The reason why the availability total value of the job 2 is 2 is because the availability of each of the workers C and D executing the job 2 is 1.

Availability threshold holding means 12 holds an availability threshold. The availability threshold indicates the upper limit of the availability total value which can be given to the job existing at the same position from the left in the availability total value holding means 17.

For example, the upper limit of the availability total value which can be given to the job 3 is 3 and that of the job 2 is 2.

The availability threshold is calculated by availability threshold calculating means 15. The availability threshold calculating means 15 holds, for example, a table associating the order of values of jobs with availability thresholds. For each job in the job pool 14, the availability according to the order of the value is determined on the basis of the table. Alternately, the availability threshold calculating means 15 may calculate the availability threshold by using the number of jobs in the job pool 14, the number of available (unoccupied) workers, the value of a job, or the like. The availability threshold calculating means 15 re-calculates an availability threshold each time a job is generated in the job pool 14.

Job management means 16 sends a job whose availability total value is less than the availability threshold among jobs in the job pool 14 to a worker via communication means 13. The job management means 16 receives a result returned from the worker, based on the received result, manages (for example, deletes and generates) a job in the job pool 14, and manages (for example, changes) the job number (job No.) and the availability total value in the availability total value holding means 17.

Control means 19 executes a master program which will be described later to control the entire master computer 11.

The functions realized by the above-described means in the master computer 11 may be realized by hardware configuration or execution of a program.

A worker executes a job sent from the master computer 11 and returns the result of executing the job to the master computer 11.

The master computer 11 operates according to a master program and the worker operates according to a worker program.

Each of the master program and the worker program will be described in detail hereinbelow.

First, the master program will be described.

Figure 2:
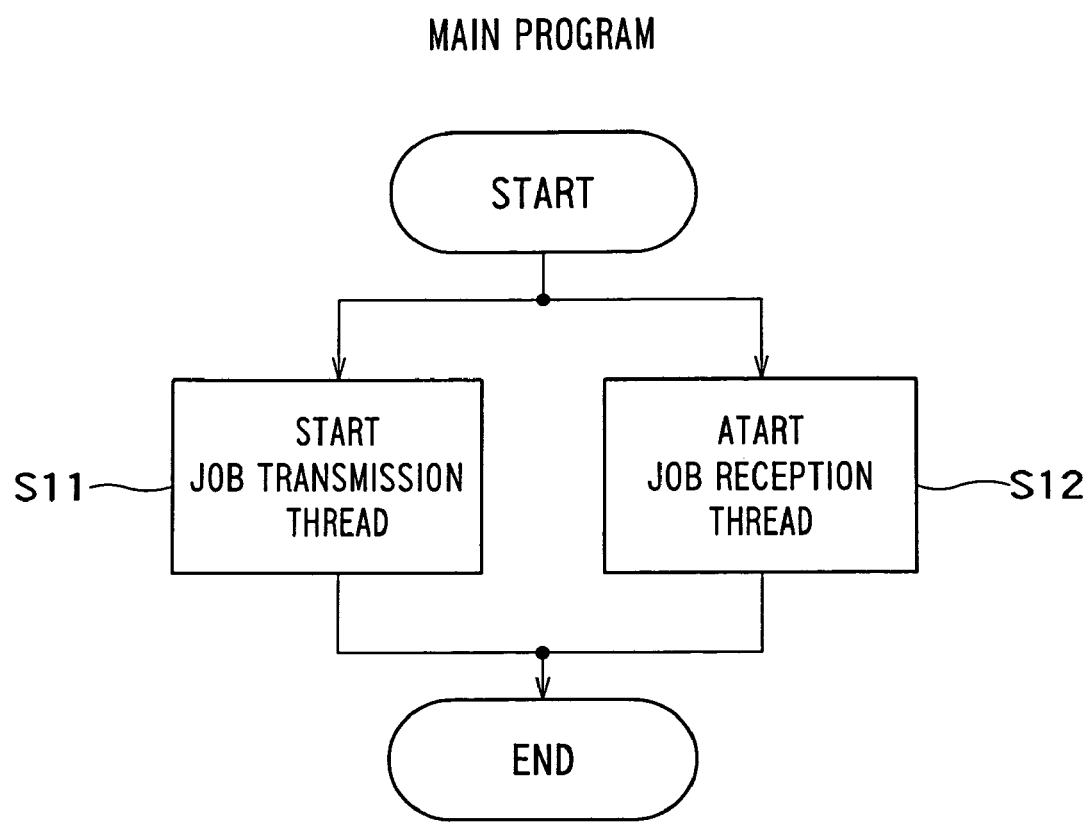
FIG. 2 is a flowchart showing steps of a master program executed by a master computer.

FIG. 2 is a flowchart showing steps of a master program executed by the control means 19 in the master computer 11.

As shown in FIG. 2, the master program includes a job transmission thread and a job reception thread. The control means 19 starts the job transmission thread and the job reception thread (steps S11 and S12). When the job transmission thread and the job reception thread end, the master program ends.

The job transmission thread and the job reception thread will be described below.

First, the job transmission thread will be described.

Figure 3:
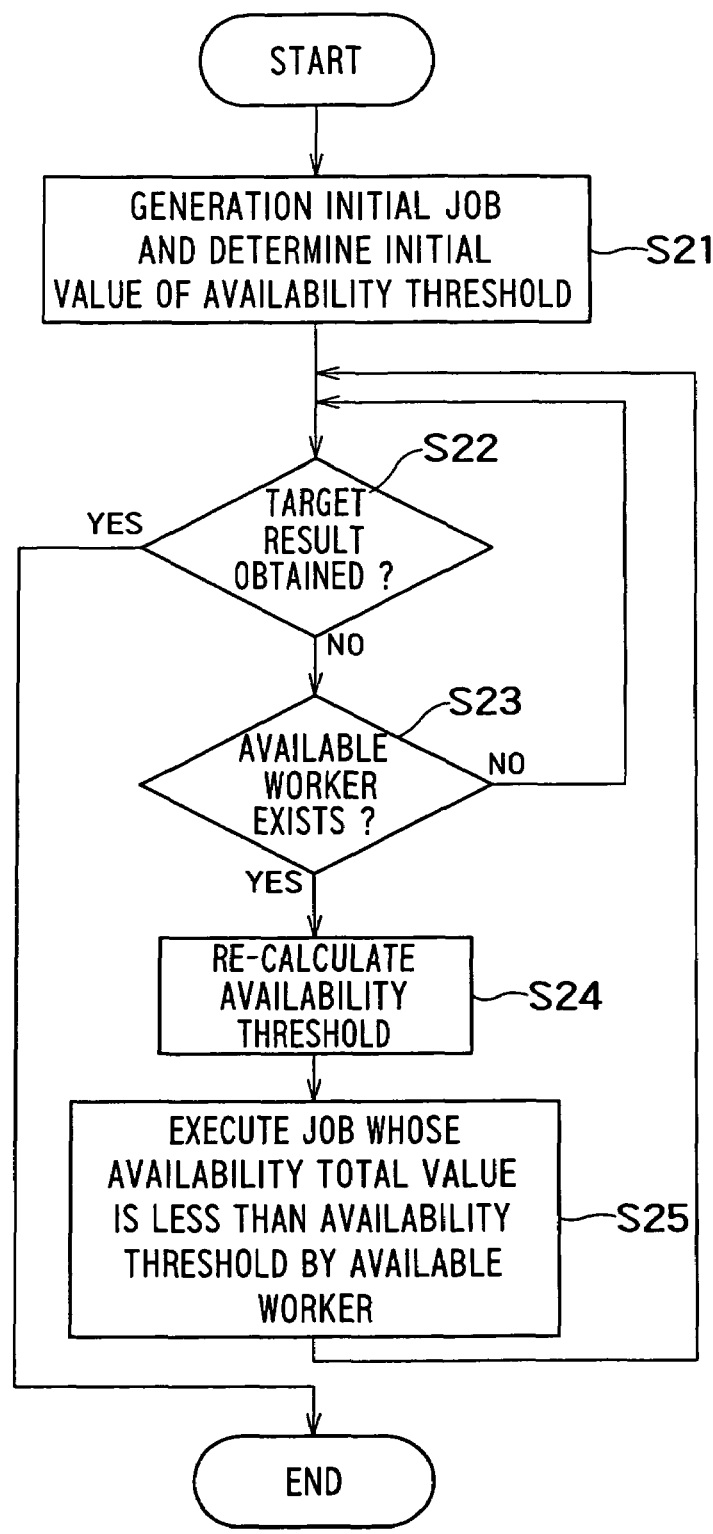
FIG. 3 is a flowchart showing steps of a job transmission thread.

FIG. 3 is a flowchart showing steps of the job transmission thread.

First, the control means 19 generates an initial job (for example, plural jobs) in the job pool 14, and the availability threshold calculating means 15 calculates the initial value of the availability threshold. The job management means 16 stores a job number and an availability total value into the availability total value holding means 17 (step S21).

Next, the control means 19 determines whether a target result has been obtained or not (step S22). In the case where a target result is obtained (YES in step S22), the control means 19 finishes execution of the job transmission thread.

In the case where a target result has not been obtained yet (NO in step S22), the control means 19 determines whether an available worker exists or not (step S23).

In the case where an available worker does not exist (NO in step S23), the control means 19 returns to step S22.

On the other hand, in the case where an available worker exists (YES in step S23), the availability threshold calculating means 15 re-calculates the availability threshold for each of the jobs in the job pool 14 (step S24).

The job management means 16 sends a job whose availability total value is less than the availability threshold to an available worker (step S25). At this time, the job management means 16 updates the availability total value in the availability total value holding means 17 (step S25).

After that, the control means 19 returns to step S22 and determines whether a target result has been obtained or not.

The job reception thread will now be described.

Figure 4:
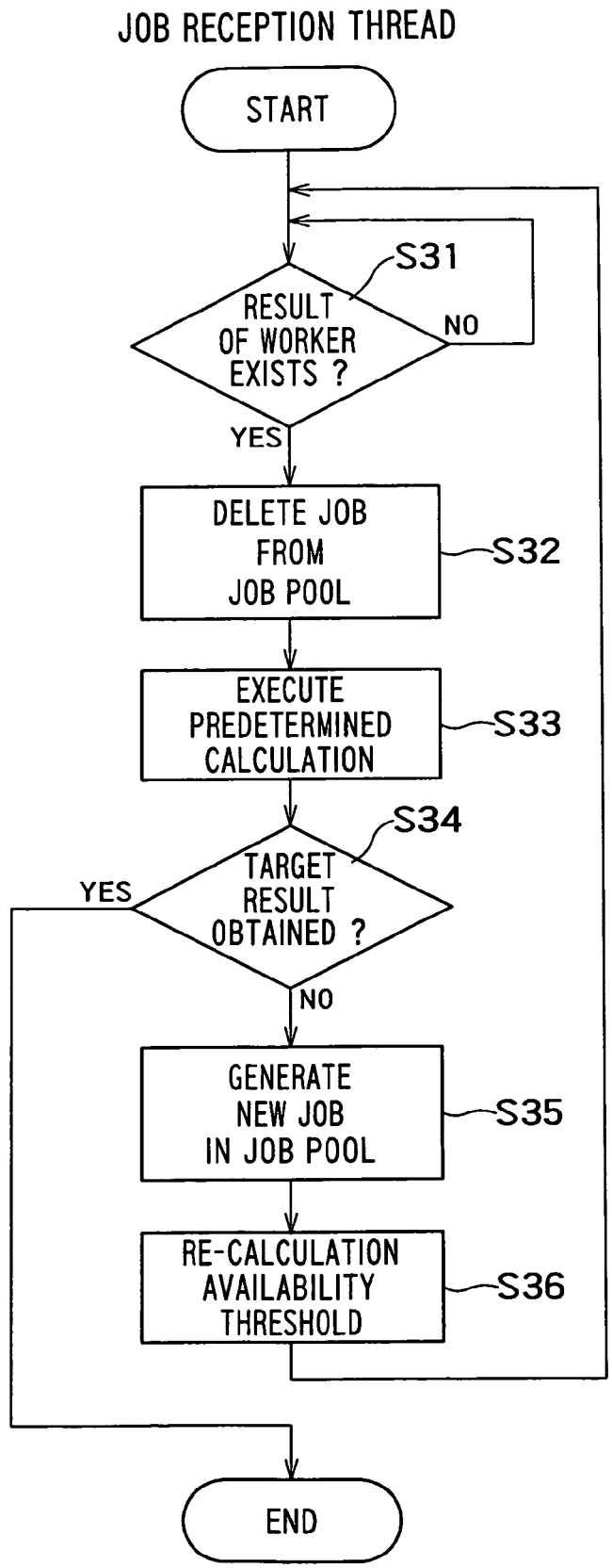
FIG. 4 is a flowchart showing steps of a job reception thread.

FIG. 4 is a flowchart showing steps of the job reception thread.

First, the job management means 16 determines whether a job result has been returned from a worker or not (step S31).

In the case where a job result has not been returned yet from a worker (NO in step S31), the job management means 16 waits until the job result is returned.

On the other hand, in the case where the job result is returned from the worker (YES in step S31), the job management means 16 deletes the job from the job pool 14 (step S32).

After that, the control means 19 executes predetermined calculation by using the returned job result (step S33) and determines whether the target result has been obtained or not (step S34).

In the case where the target result is obtained (YES in step S34), the control means 19 finishes executing the job reception thread.

On the other hand, in the case where a target result has not been obtained (NO in step S34), the control means 19 makes the job management means 16 generate a new job (or new jobs) in the job pool 14 by using the returned job result (step S35).

Next, the availability threshold calculating means 15 recalculates the availability threshold on each of the jobs in the job pool 14 (step S36). After that, the control means 19 returns to step S31.

The worker program will now be described.

Figure 5:
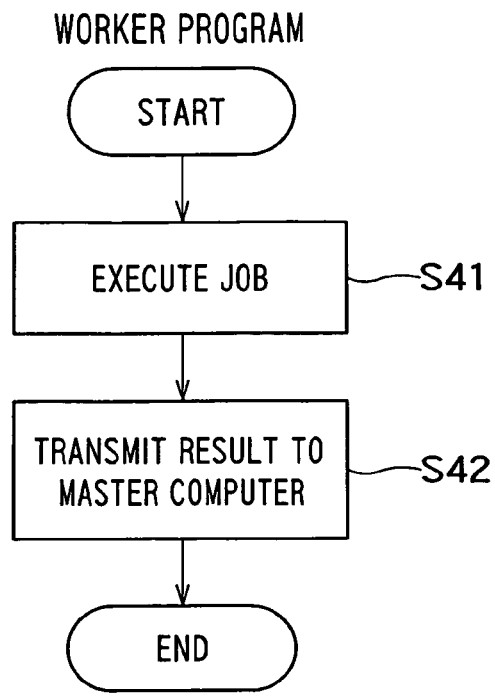
FIG. 5 is a flowchart showing steps of a worker program.

FIG. 5 is a flowchart showing steps of a worker program to be executed by a worker.

A worker executes a job given from the master computer 11 (step S41) and transmits a result of executing the job to the master computer 11 (step S42).

An example of performing calculation of an optimization problem by a branch and bound method by using the computer system according to the embodiment will be described.

First, the branch and bound method will be briefly described.

The branch and bound method is one of methods for solving the optimization problem. In the branch and bound method, the space of a solution is expressed by a tree and a path from the root to a leaf is regarded as one solution (refer to FIG. 6). While creating a tree, an optimum path, that is, an optimum solution is found.

For example, in the knapsack problem as one of optimization problems, a node in a tree at a depth "d" indicates whether the d-th item should be placed in the knapsack or not. The whole tree shows all of the cases whether an item should be placed in each of the nodes or not. The way the items are placed (a path from the root to a leaf), which achieves the highest evaluation value among all of the cases is the solution to the knapsack problem.

The solution is obtained while creating a tree from the root toward leaves. An operation of branching a node to make a new node (or new nodes) is called a branching operation.

It is now assumed that a solution achieving the highest evaluation value is being obtained. In the case where a tree is expanded downward from each node, the maximum evaluation value which can be achieved at each node can be calculated for each node. The maximum evaluation value is called an upper bound value. On the other hand, an evaluation value which can be achieved at least can be also calculated for each node and is called a lower bound value.

In the case where the upper bound value of a node is below the lower bound value of another node, the optimum solution cannot be clearly reached by a search passing the node. Therefore, in this case, the branching operation from the node is interrupted. This process is called a bounding operation. In the branch and bound method, by stopping an unnecessary search for a solution by the bounding operation, the solution search space is bounded.

The upper and lower bound values can be used for the bounding operation and also used as indexes of promise of an operation for searching a tree below a target node. For example, a node having a large lower bound value has high possibility that a large evaluation value can be obtained. Consequently, it can be said that the node is promising.

In the following, the branching operation at each node will be regarded as a job and the promise of each node will be regarded as the value of the job. An example of executing calculation of the branch and bound method by the computer system will be described.

First, a state at a time point during calculation according to the branch and bound method will be described with reference to FIGS. 6 to 14 and, after that, the subsequent operations will be described.

Figure 6:
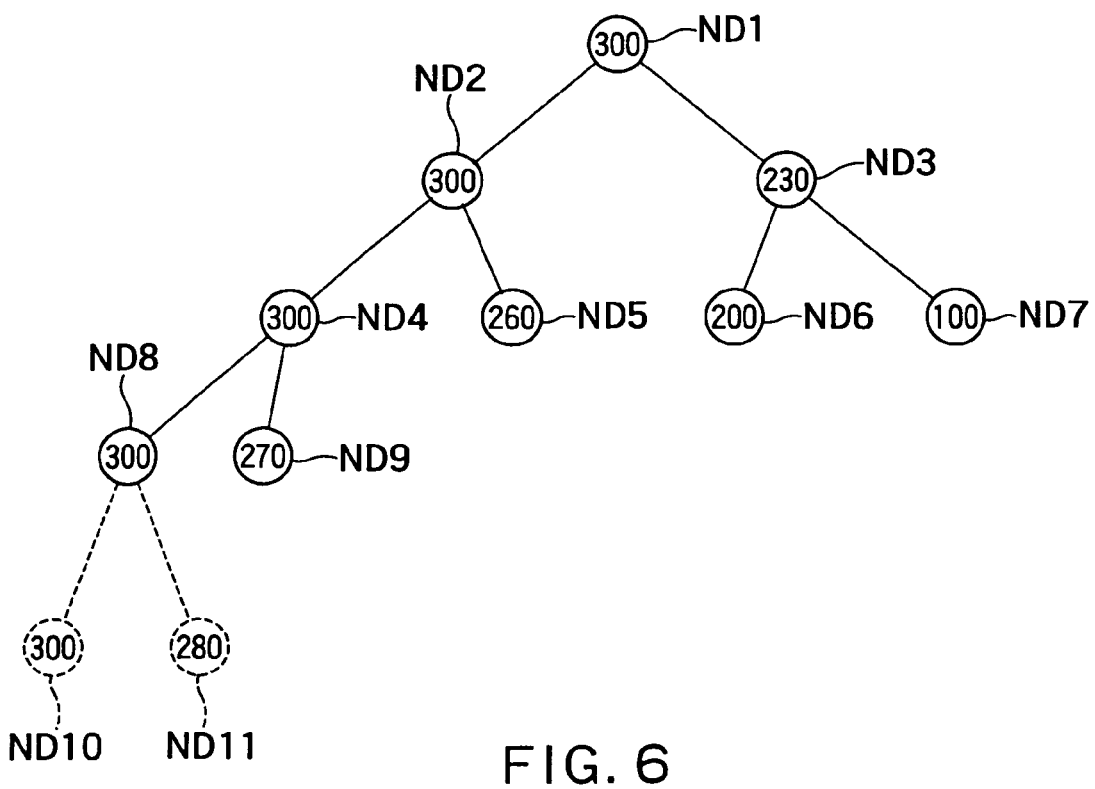
FIG. 6 is a diagram showing a state of a tree during execution of calculation according to a branch and bound method.

FIG. 6 is a diagram showing a state of a tree during search for a solution by the branch and bound method.

The tree has plural nodes ND1 to ND9. Among them, the nodes ND5 to ND9 are at the forefront of the search at the present time point. The branching operation by each worker is performed at each of the nodes ND5 to ND9. At each node, the value from the viewpoint of premise of the search can be calculated. The numerical value in the circle of each node indicates the value.

Figure 7:
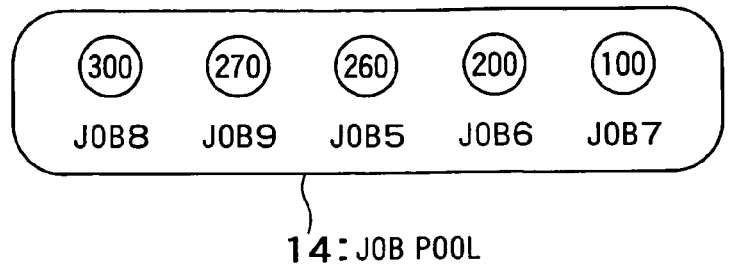
FIG. 7 is a diagram showing a job pool.

FIG. 7 is a diagram showing a state in the job pool 14 at the present time point.

As shown in FIG. 7, jobs 5 to 9 corresponding to the nodes ND5 to ND9 existing at the forefront of the search in the tree of FIG. 6 are stored. From the left side in the diagram, the jobs are sorted so that their values are in decreasing order.

Figure 8:
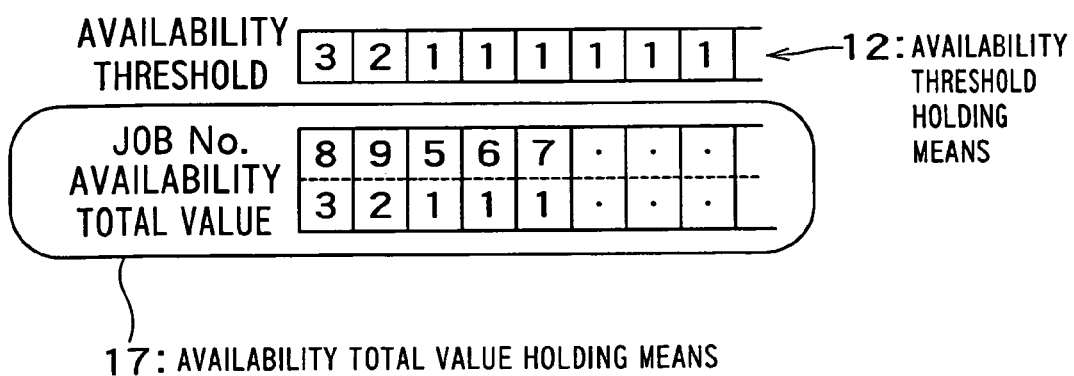
FIG. 8 is a diagram showing availability total value holding means.

FIG. 8 is a diagram showing availability thresholds, job numbers and the availability total values of the jobs 5 to 9.

As shown in FIG. 8, 3,2,2,2,1 are given as availability thresholds in a descending order. The availability total value of the job 8 having the highest value is 3, that of the job 9 having the next highest value is 2, and that of the remaining jobs 5 to 7 is 1.

Figure 9:
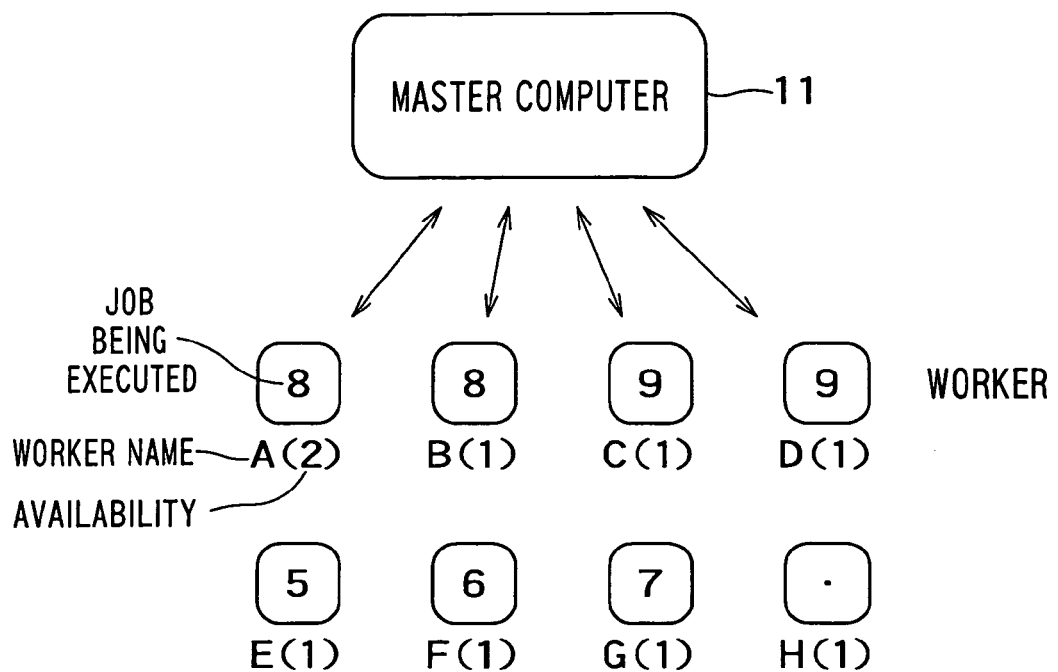
FIG. 9 is a diagram showing a state where jobs are assigned to workers.

FIG. 9 is a diagram showing a state where the jobs 5 to 9 are assigned to workers.

Figure 10:
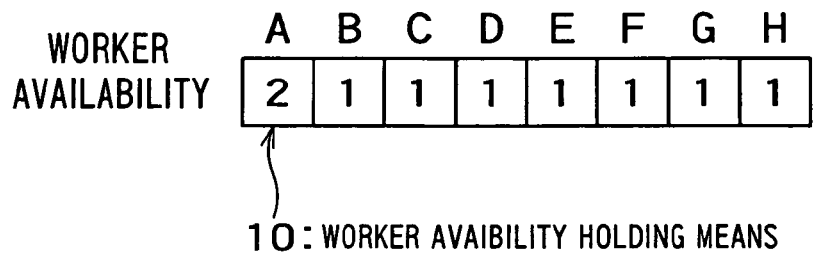
FIG. 10 is a diagram showing availability holding means.

There are workers A to H. The numerical values 5 to 9 in the workers indicate numbers of jobs being executed. An index called availability is attached to each of he workers A to H. The numerical values in parenthesis denote the availability. FIG. 10 shows the worker availability holding means 10 in the master computer 11. The corresponding relation between a worker name and availability is indicated by the worker availability holding means 10.

Figure 11:
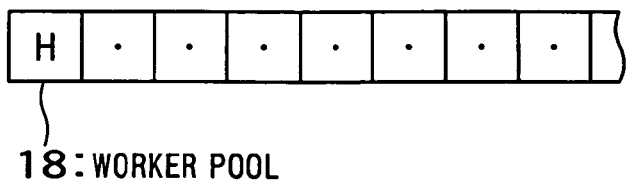
FIG. 11 is a diagram showing a worker pool.

FIG. 11 is a diagram showing a worker pool 18 for managing a worker available state. The worker pool 18 is provided in the master computer 11 (not seen in FIG. 1).

A worker H is registered in the worker pool 18. It indicates that the worker H is in an available state (refer to FIG. 9).

The subsequent process in such a state will be described below. In the following description, for reference, the step numbers shown in the flowcharts in FIGS. 3 and 4 are given.

First, the worker A finishes execution of the job 8 (refer to FIG. 9) and returns the job result to the master computer 11. The control means 19 registers the worker A in the worker pool 18 (refer to FIG. 11) (step S31 in FIG. 4).

The job management means 16 deletes the job 8 processed by the worker A from the job pool 14 (refer to FIG. 7) and also deletes the data of the job 8 from the availability total value holding means 17 (refer to FIG. 8) (step S32 in FIG. 4).

The operation of the worker B executing the job 8 is stopped and the worker B is registered in the worker pool 18.

On the other hand, the control means 19 performs predetermined computation by using the result of the job from the worker A and calculates the value (the value of the job) from the viewpoint of premise of the search for a solution in the next nodes ND10 and ND11 (refer to FIG. 6) (step S33 in FIG. 4). If there is a node which can be pruned (branch cutting), pruning is performed.

Figure 12:
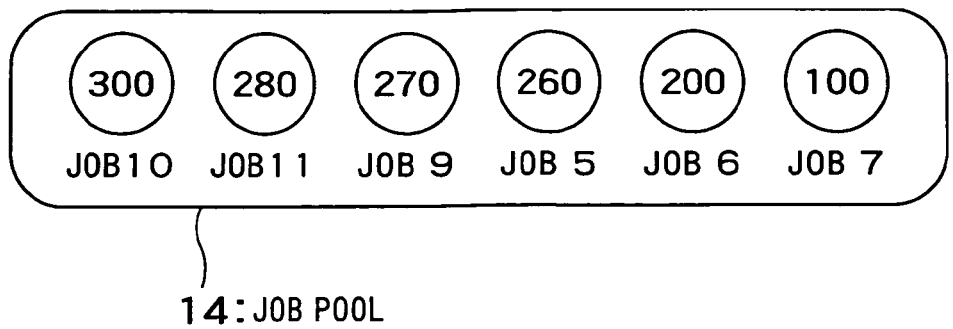
FIG. 12 is a diagram showing a job pool.

The control means 19 determines that the target result has not been obtained at the present time point (NO in step S34 in FIG. 4), and the job management means 16 registers the jobs 10 and 11 corresponding to the new nodes ND10 and ND11 generated by using the result of the job 8 into the job pool 14 (step S35 in FIG. 4). FIG. 12 shows this state. Since the values of the jobs 10 and 11 are higher than those of the jobs 9, 5, 6, and 7, the jobs 10 and 11 are disposed at the head side in the job pool 14 (left side in the diagram).

Figure 13:
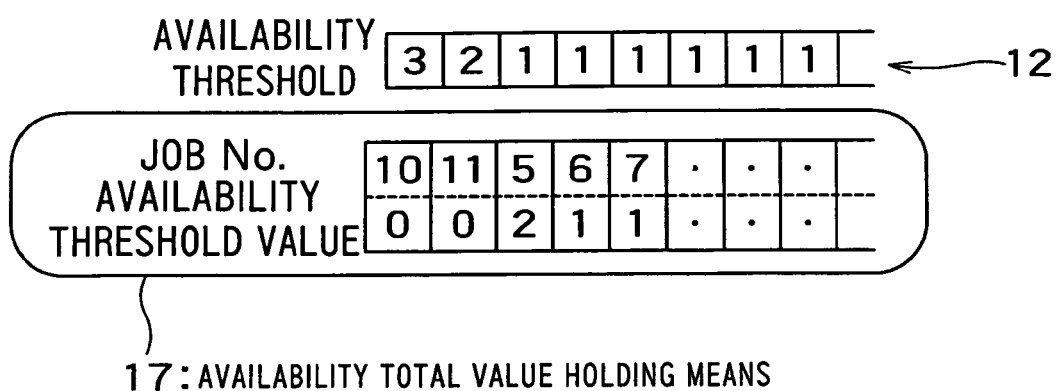
FIG. 13 is a diagram showing availability total value holding means.

When new jobs are generated in the job pool 14, the availability threshold calculating means 15 calculates the availability threshold and the job management means 16 sets the job number and the availability total value again (step S36 in FIG. 4). FIG. 13 shows this state. At this time point, the availability total value of each of the jobs 10 and 11 newly generated is 0. Next, the control means 19 determines whether an available worker exists or not (step S23 in FIG. 3). At the present time point, as understood from the above description, the workers A, B, and H are available (YES in step S23 in FIG. 3). Therefore, after re-calculation of the availability threshold by the availability threshold calculating means 15 (step S24 in FIG. 3), the job management means 16 assigns the jobs 10 and 11 to the available workers (step S25 in FIG. 3). For example, the job management means 16 assigns the job 10 whose availability threshold is 3 to two workers A and B, and assigns the job 11 having the availability threshold of 2 to the worker H.

By continuing the process, search for the tree is performed and the final solution (evaluation value) is obtained (YES in step S22 in FIG. 3 and YES in step S34 in FIG. 4).

Effects obtained by using the computer system according to the embodiment for calculation according to the branch and bound method will be described as follows.

Specifically, since the branching process in the effective direction (branching process at a node having a high job value) is multiplexed and executed, even if a searching process (job) in the effective direction is assigned to a heavily loaded worker (for example, whose performance is lower than the others) or a worker which becomes defective in the middle, interruption or stagnation of computation in the effective direction can be reduced. Since the lower bound value calculation in the effective search direction is not also interrupted or stagnated, there is also an advantage that a pruning process is not delayed.

The order in the job pool of even a job whose value is lower than the others and which is not multiplexed increases after a job having a higher value is finished, so that the job can be multiplexed finally. That is, even by a job whose value is low, interruption or stagnation of the process can be reduced.

As described above, according to the embodiment, a job having a high value is preferentially executed, so that the overall parallel calculation itself can be finished without a conspicuous delay.

Second Embodiment

In a second embodiment, an example in which availability of a worker is used as reliability of the worker will be described.

It is assumed that the reliability of the worker A is 2, that of the workers B to H is 1, and that of the worker A is twice as high as that of the other workers. In the case where processes similar to those in the first embodiment are performed on such assumption, in the case of executing a job having the availability threshold of 3 and using the worker A whose availability is 2, the worker A and another worker (such as B) having availability of 1 are used. On the other hand, in the case of executing a job by a worker whose availability of only 1, for example, three workers B, C, and D are used. In the case of executing a job by workers having high reliability, two workers are used. In the other cases, three workers are used. In such a manner, workers can be efficiently used.

Third Embodiment

In a third embodiment, an example of using processing ability (for example, calculation speed) of the worker as the availability of a worker will be described. It is assumed that the calculation speed of the worker A is 2, that of the workers B to H is 1, and that of the worker A is twice as fast as that of the other workers. On such assumption, processes similar to those of the first embodiment are performed.

At the time of calculating an availability total value, however, the availability of workers executing the job is not added. For example, a value obtained by adding the availability of a worker newly executing a job to a value which is obtained by increasing the present availability total value by 1.5 times is used as an availability total value. As an availability total value, a value calculated on the basis of functions by the availability of a worker presently executing the job and job execution lapsed time may be used.

For example, in the case of executing a job having the availability threshold of 3, first, the worker A having availability of 2 is used and, after that, another worker (for example, B) having availability of 1 is used. Consequently, the availability total value at that time point is 2×1.5+1=4 (>3) and a job is executed by two workers. It is noted that in the case where the availability total value does not exceed the availability threshold at the time point when jobs are assigned, the availability total value may exceed the availability threshold after assignment of jobs.

On the other hand, in the case of executing a job only by workers whose availability is 1 sequentially, a job is executed in order of, for example, the workers B, C, and D. The availability total value after executing a job by the worker B is 1, that after executing a job by the worker C is 1×1.5+1=2.5, and that after executing a job subsequently by the worker D is 2.5×1.5+1=4.75 (>3).

Therefore, in the case of using workers having high calculation speed, a process is executed by a small number of workers. In the case of using workers having low calculation speed, a process is executed by a number of workers. Consequently, in the case of using workers having high calculation speed, the number of workers used can be reduced.

Fourth Embodiment

In a fourth embodiment, it is assumed that workers belong to any of groups. Group number holding means for holding groups of workers is introduced in a master computer.

Figure 14:
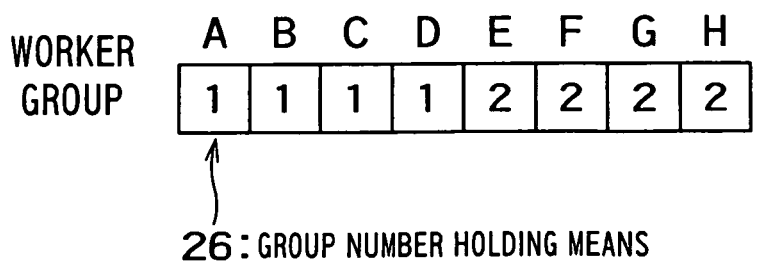
FIG. 14 is a diagram showing group number holding means.

FIG. 14 shows group number holding means 26. In FIG. 14, it is assumed that the workers A to D belong to group 1, the workers E to H belong to group 2, and a failure of a worker tends to occur in the same group.

At the time of assigning jobs to workers having the same availability, jobs are assigned to workers of a group different from the group to which the worker executing the job at present belongs.

For example, in the case where the availability threshold of a job is 2, a worker whose availability is 1 and which belongs to the group 1 is already assigned, and another worker is assigned, a job is assigned to a worker whose availability is 1 and which belongs to group 2.

In a case such that a failure tends to occur sequentially in workers belonging to the same group, by assigning a job to another group, the possibility that a job normally finishes can be increased.

Fifth Embodiment

In a fifth embodiment, an example of calculating an availability threshold by using the value of a job will be concretely described.

For example, when there are five jobs in the job pool and the values of the jobs are 300, 200, 100, 100, and 100, respectively, the availability thresholds are set as 3, 2, 1, 1, and 1, respectively.

More specifically, in the case where eight workers exist, by multiplying the value obtained by dividing the value of a job by the sum (300+200+100+100+100=800) of the values of the jobs with the number (8) of workers, the availability threshold is obtained.

By calculating the availability threshold in this method, the higher the value of a job is, the higher the availability total value can become. Consequently, the reliability of calculation of a job having a high value can be increased (for example, in the case where the higher the reliability of the worker is, the higher the availability is), or the calculation speed of a job having a high value can be increased (for example, in the case where the higher the speed of the worker is, the higher the availability is).

Sixth Embodiment

Figure 15:
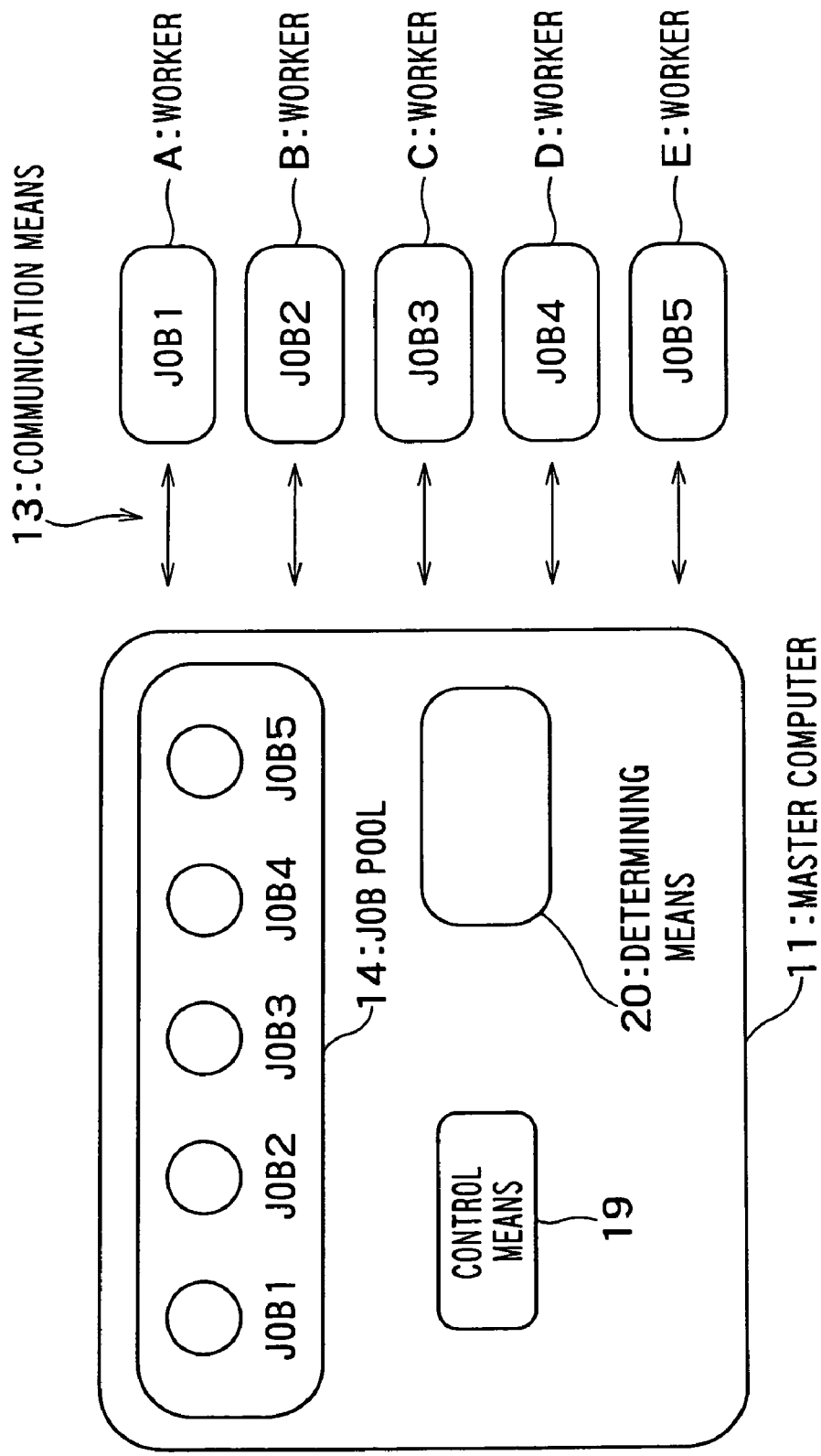
FIG. 15 is a diagram showing a basic configuration of a computer system for executing a parallel computing method as a sixth embodiment of the invention.

FIG. 15 is a diagram showing a basic configuration of a computer system for carrying out a parallel calculating method as the sixth embodiment of the invention.

In the following, the basic configuration and operation of the computer system will be described and, after that, a concrete application example of the computer system will be described.

The job pool 14 in the master computer 11 stores a job generated by the master computer 11. The job is executed by the worker and the result of the job is returned to the master computer 11. Determining means 20 for determining end of job result collection determines whether collection of job results is finished or not by using a job result returned from one or more workers.

The control means 19 controls the whole master computer 11 by executing a master program. The workers A to E operate according to the same worker program as that of the first embodiment.

Figure 16:
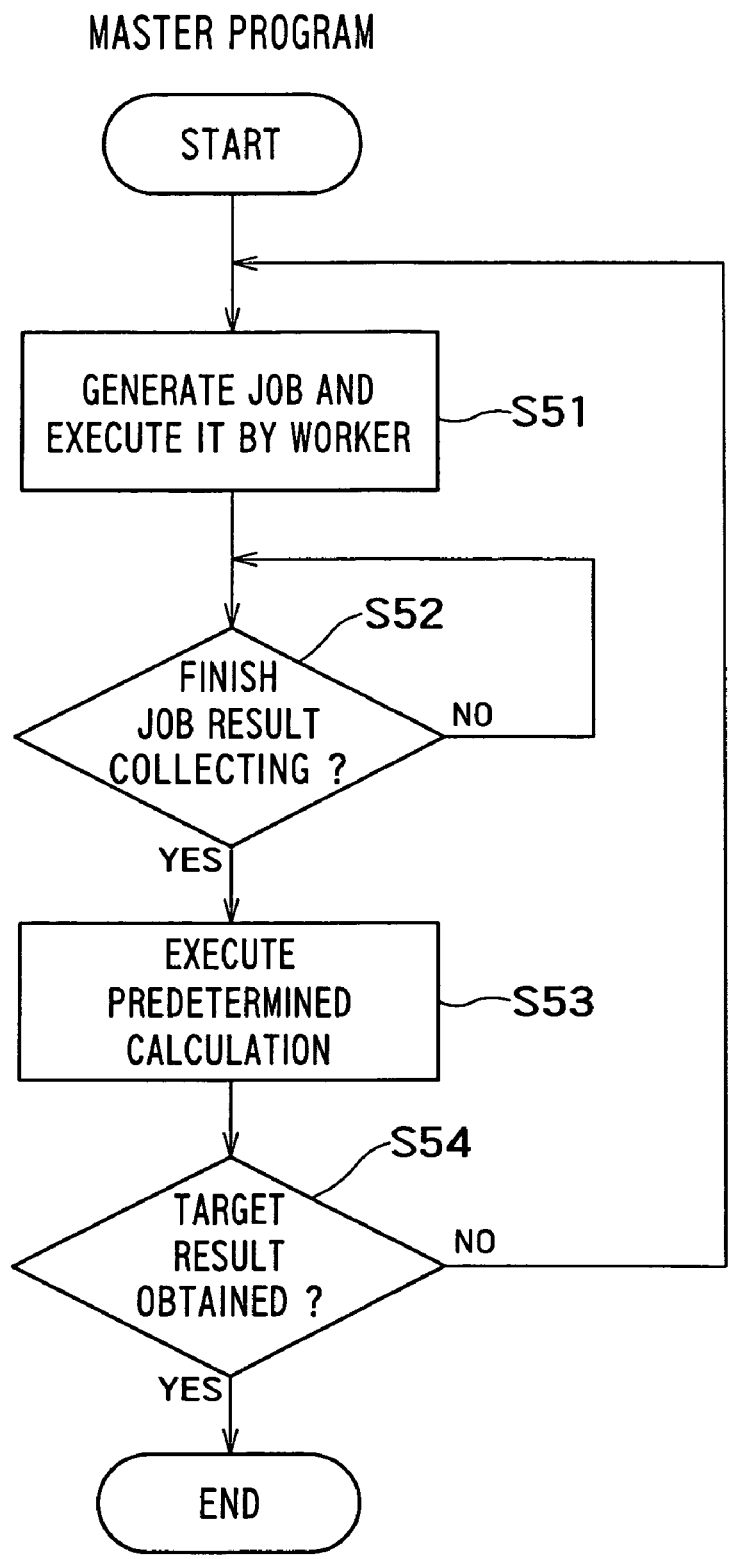
FIG. 16 is a flowchart showing steps of a master program executed by a master computer.

FIG. 16 is a flowchart showing steps of the master program executed by the control means 19 in the master computer 11.

First, the control means 19 generates one or more jobs and allows a worker execute the jobs (step S51).

The control means 19 receives job results returned from the worker one by one, and the determining means 20 makes determination of whether collection of job results is finished or not on the basis of, for example, the number of collected job results (step S52).

In the case where the determining means 20 determines that collection of job results is not finished (NO in step S52), the control means 19 waits again for a job result from the worker.

On the other hand, in the case where the determining means 20 determines that collection of job results is finished (YES in step S52), the control means 19 executes predetermined calculation on the basis of the received job result (step S53).

The control means 19 determines whether a target result has been obtained or not from the result of predetermined calculation (step S54). In the case where the target result has been obtained (YES in step S54), the control means 19 finishes the process. In the case where the target result has not been obtained (NO in step S54), the control means 19 returns to step S51 and generates a new job.

An example of executing weighting calculation on a neural network by using the computer system of the embodiment will be described below.

First, the neural network will be briefly described.

The neural network is a model of predicting an output from input data.

Figures 17, 18:
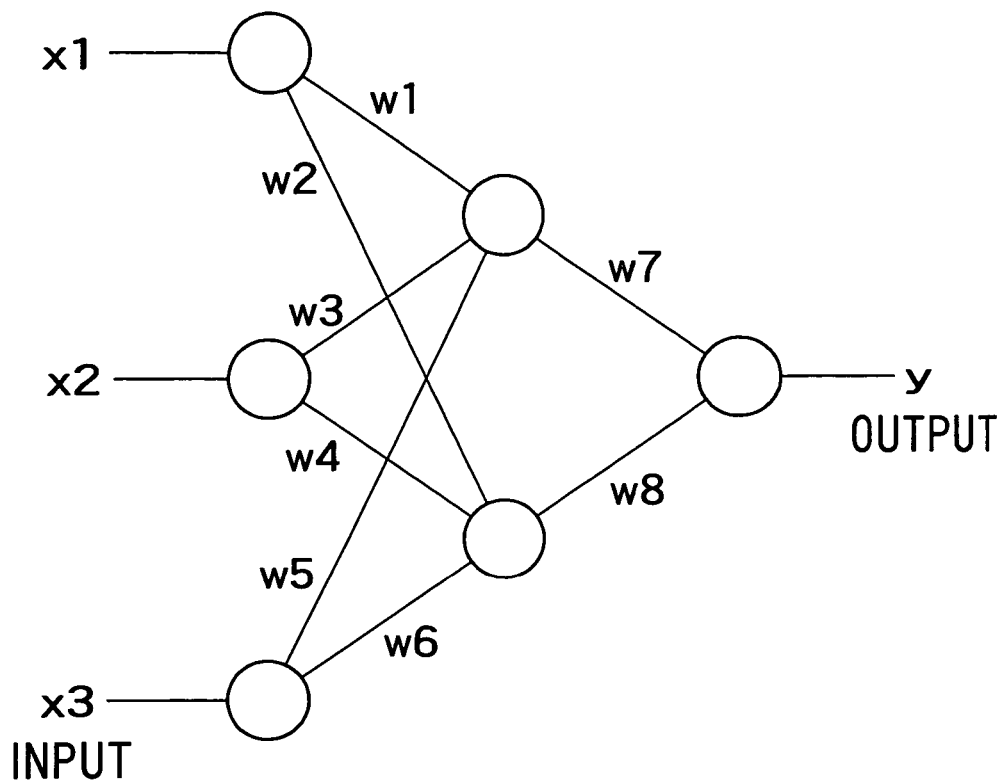
FIG. 17 is a configuration diagram of a three-layer neural network.
FIG. 18 is a diagram showing an example of learn data given to the three-layer neural network.

FIG. 17 is a diagram showing an example of a neural network having a three-layered structure.

Elements are arranged in three lines in the lateral direction of the diagram between an input and an output and the elements in the neighboring lines are linked to each other. By setting proper weight to each link, a prediction model is constructed. A case of learning a model for predicting an output (y) from a three-dimensional input (x1, x2, x3) will be considered here. Weight of the j-th link is set as wj, and the weight of the whole is set as W (not shown). FIG. 18 shows an example of six sets of learn data D1 to D6 used for learning. Data of the i-th set is expressed as Di.

In the weighting calculation on the neural network, the initial value (for example, weight at time 0) W0 of the whole weight W is determined and is updated each time so that the performance of the model is good and convergence is determined, thereby obtaining the final whole weight. A method of obtaining, from the whole weight Wt at time t, the whole weight Wt+1 at the subsequent time t+1 is expressed as follows.

$$Wt+1 = Wt + \Delta Wt \qquad \text{Equation 1}$$

where $\Delta Wt = \text{constant} \times (\Delta wt1 + \Delta wt2 + \Delta wt3 + \Delta wt4 + \Delta wt5 + \Delta wt6)$ $\Delta wti$ (i=1 to 6) is an element of the difference calculated from Di (i=1 to 6) (refer to FIG. 18).

Figure 19:
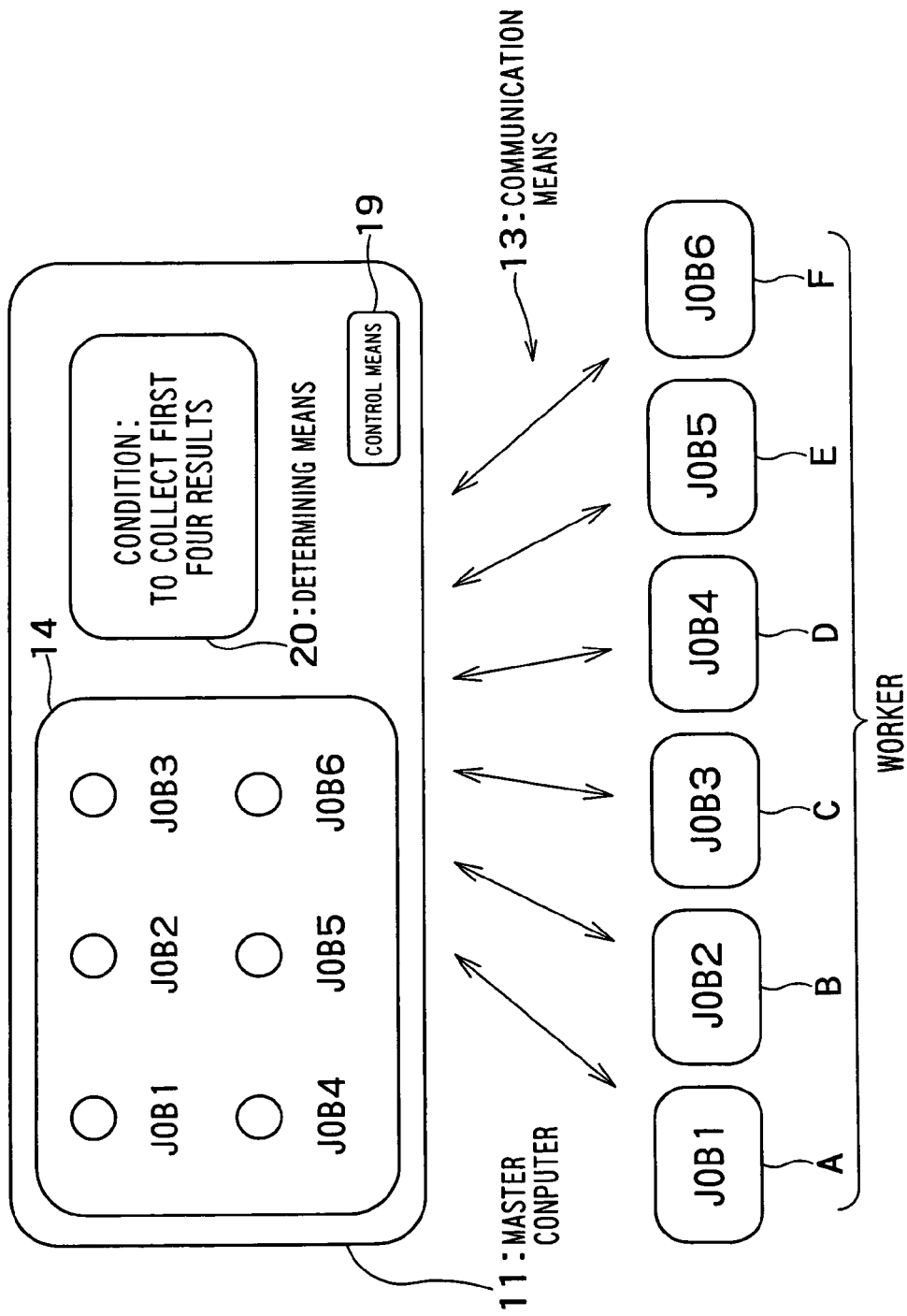
FIG. 19 is a diagram showing a state where the computer system of FIG. 15 performs weighting calculation of the neural network.

FIG. 19 is a diagram showing a state where the weighting calculation is executed by the computer system.

In the case where the weighting calculation on the neural network is executed in a master-worker manner, calculation of $\Delta wti$ is executed as a job "i" by a worker. Specifically, a process is performed by using $\Delta wt1$ as job 1, $\Delta wt2$ as job 2, . . . and $\Delta wt6$ as job 6.

In normal weighting calculation, results of all of the jobs 1 to 6 are collected, $\Delta Wt$ is calculated and, after that, a weight updating step is advanced by one in accordance with Equation 1.

In the embodiment, however, on completion of collection of part of jobs, the weight updating step is advanced.

For example, as shown in FIG. 19, a condition that "job results of first four workers are to be collected" from six workers A to F (job result collection end condition) is given to the determining means 20. In this case, when it is assumed that results of the jobs 2 to 5 return before the results of the jobs 1 and 6, the determining means 20 determines end of collection of the job results at this time point and the control means 19 advances the weight calculating updating step by one.

More specifically, first, the weight difference $\Delta Wt$ is calculated as follows.

$$\Delta Wt = \text{constant} \times (\Delta wt2 + \Delta wt3 + \Delta wt4 + \Delta wt5)$$

Subsequently, the weight is updated in accordance with Equation 1.

After that, six jobs are generated again, each of the jobs is executed by a worker, and job results of the first four workers are collected.

In the above example, as the condition of the job result collection end determination, collection of job results of the first "n" jobs is employed. Another condition may be also added to the condition. For example, for predetermined (such as two seconds) after reception of the first four jobs, end of the other jobs may be waited and job results collected during the waiting time may be added to calculation.

As described above, according to the embodiment, by providing the determining means for determining whether collection of job results is finished or not on the basis of the job result collection end condition, without collecting all of job results, calculation can be advanced by using only part of job results. Therefore, even in the case where part of workers are heavily loaded and reply of results delays or a worker is down, the whole process is not delayed or interrupted. By advancing the process by using only part of job results as described above, as compared with the case of using all of job results, the calculation precision deteriorates. Specifically, although fault tolerance and resistance to heavy load and calculation precision have a tradeoff relation, in the case such that strictness of calculation precision is not required or in an initial loop of conversion calculation, it can be said that the method is effective.

Seventh Embodiment

Figure 20:
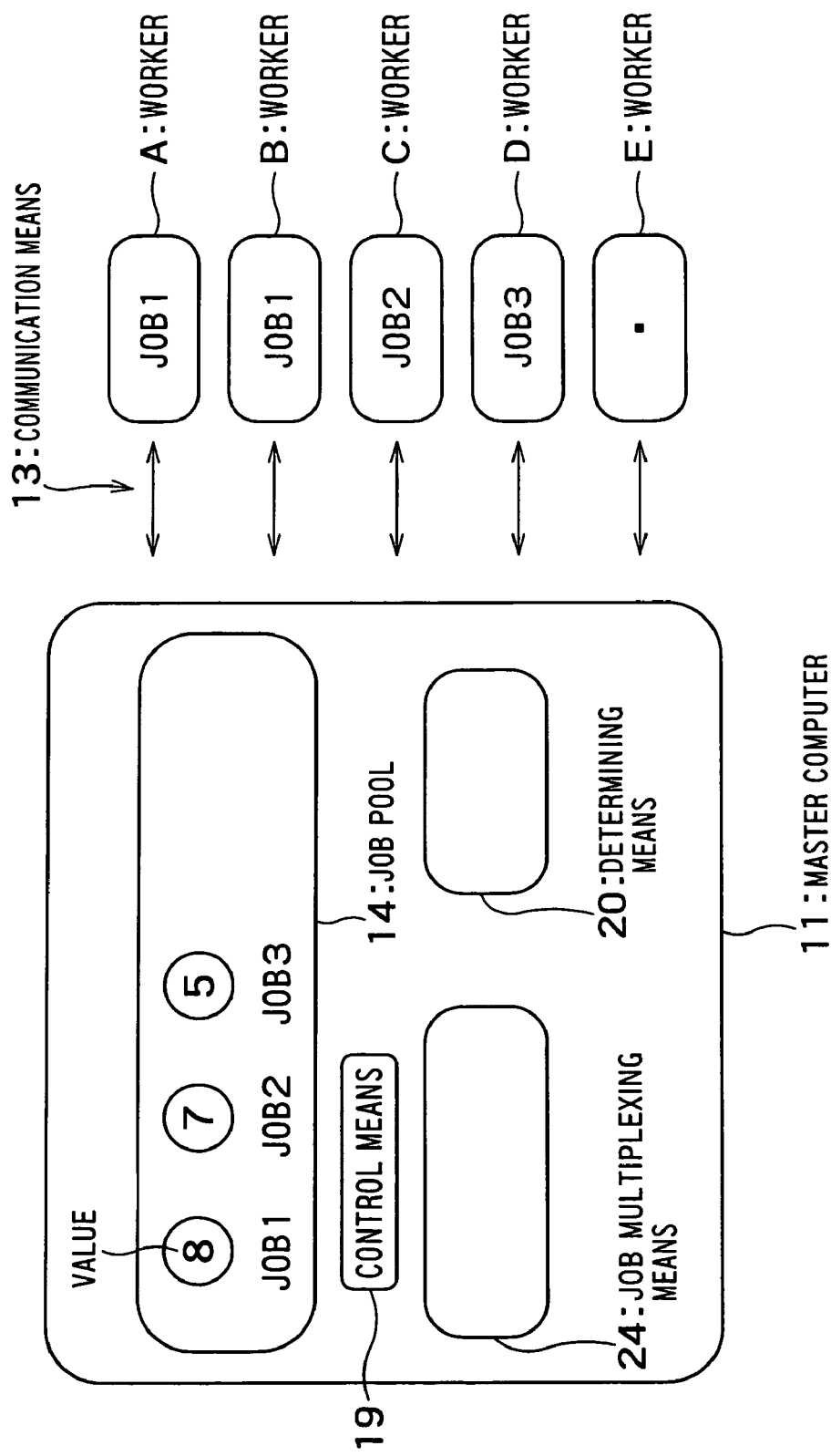
FIG. 20 is a diagram showing a basic configuration of a computer system for executing a parallel computing method as a seventh embodiment of the invention.

FIG. 20 is a diagram showing a basic configuration of a computer system for executing a parallel computing method as a seventh embodiment of the invention.

In the following, the basic configuration and operation of the computer system will be described and, after that, a concrete application example of the computer system will be described.

The job pool in the master computer 11 stores one or more jobs generated by the master computer 11. Each job has predetermined value.

Job multiplexing means 24 determines multiplicity of each job in accordance with the value of the job. Each job is executed according to the determined multiplicity. Specifically, a job having multiplicity of "n" is executed by "n" workers. Job results by the workers are returned to the master computer 11.

The determining means 20 determines whether collection of job results is finished or not on the basis of job results from the workers.

The control means 19 executes a master program to control the whole master computer 11. The workers A to E operate in accordance with the worker program which is the same as that in the first embodiment.

Figure 21:
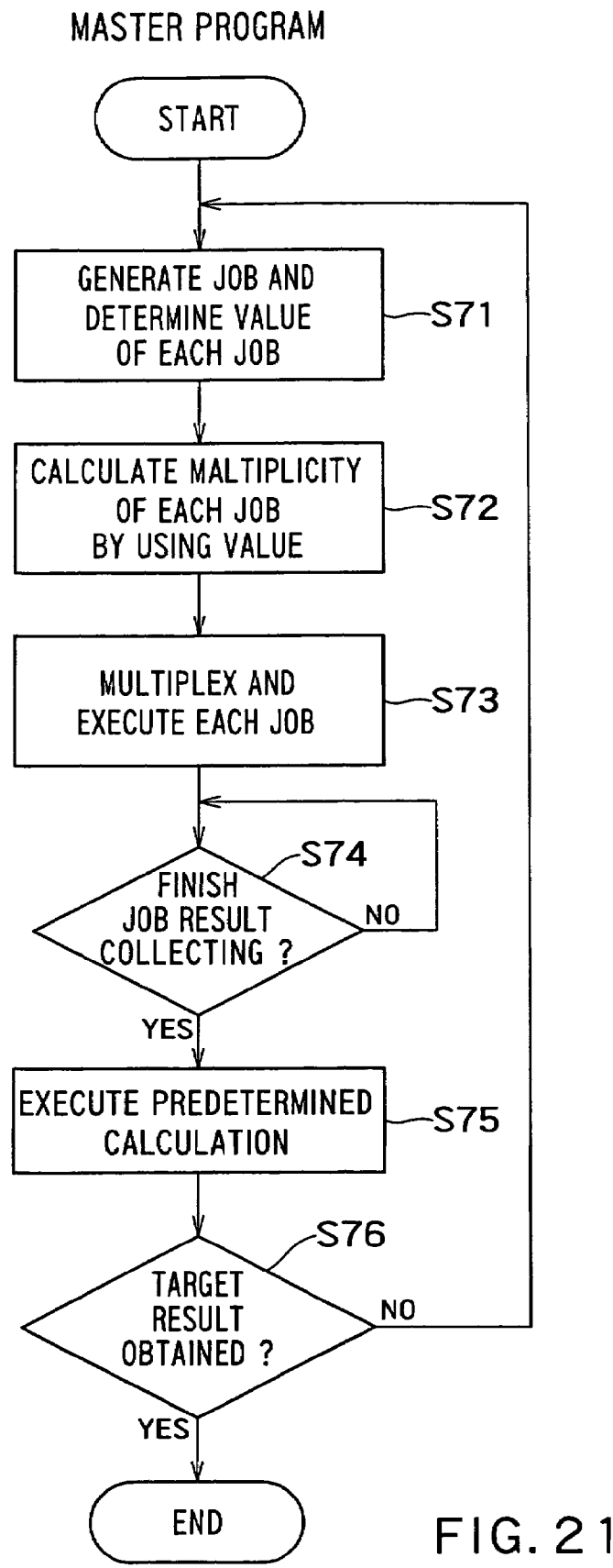
FIG. 21 is a flowchart showing steps of a master program executed by a master computer.

FIG. 21 is a flowchart showing steps of a master program executed by the control means 19 in the master computer 11.

First, the control means 19 generates jobs and calculates the value of each job (step S71).

Next, the job multiplexing means 24 calculates multiplicity according to the value of each job (step S72).

The control means 19 makes the worker execute each job in accordance with the determined multiplicity (step S73).

The control means 19 receives job results from the worker one by one, and the determining means 20 determines whether collection of job results is finished or not on the basis of a predetermined condition (step S74).

In the case where the determining means 20 determines that collection of a job result is not finished (NO in step S74), the control means 19 waits again for a job result from the worker.

On the other hand, in the case where the determining means 20 determines that collection of a job result is finished (YES in step S74), the control means 19 executes predetermined calculation by using the job results from the workers (step S75).

In the case where a target result is obtained as a result of the predetermined calculation (YES in step S76), the control means 19 finishes the process. Where a target result is not obtained (NO in step S76), the control means 19 returns to step S71 and generates a job again.

An example of executing calculation in accordance with a genetic algorithm by using the computer system according to the embodiment will be described hereinbelow.

The genetic algorithm is one of optimization methods. In the genetic algorithm, first, a work of making a collection of temporary solutions called intermediate solutions and generating a candidate of a new solution from two temporary solutions in the collection is performed at least once. After that, the generated candidate of the solution is evaluated and the solution better than the temporary solutions is left as a new temporary solution. The above work is performed until the quality of the solution does not improve any more. In the case of performing the genetic algorithm by the master-worker computer system, for example, a job is assigned for evaluation of a candidate of a solution.

Figure 22:
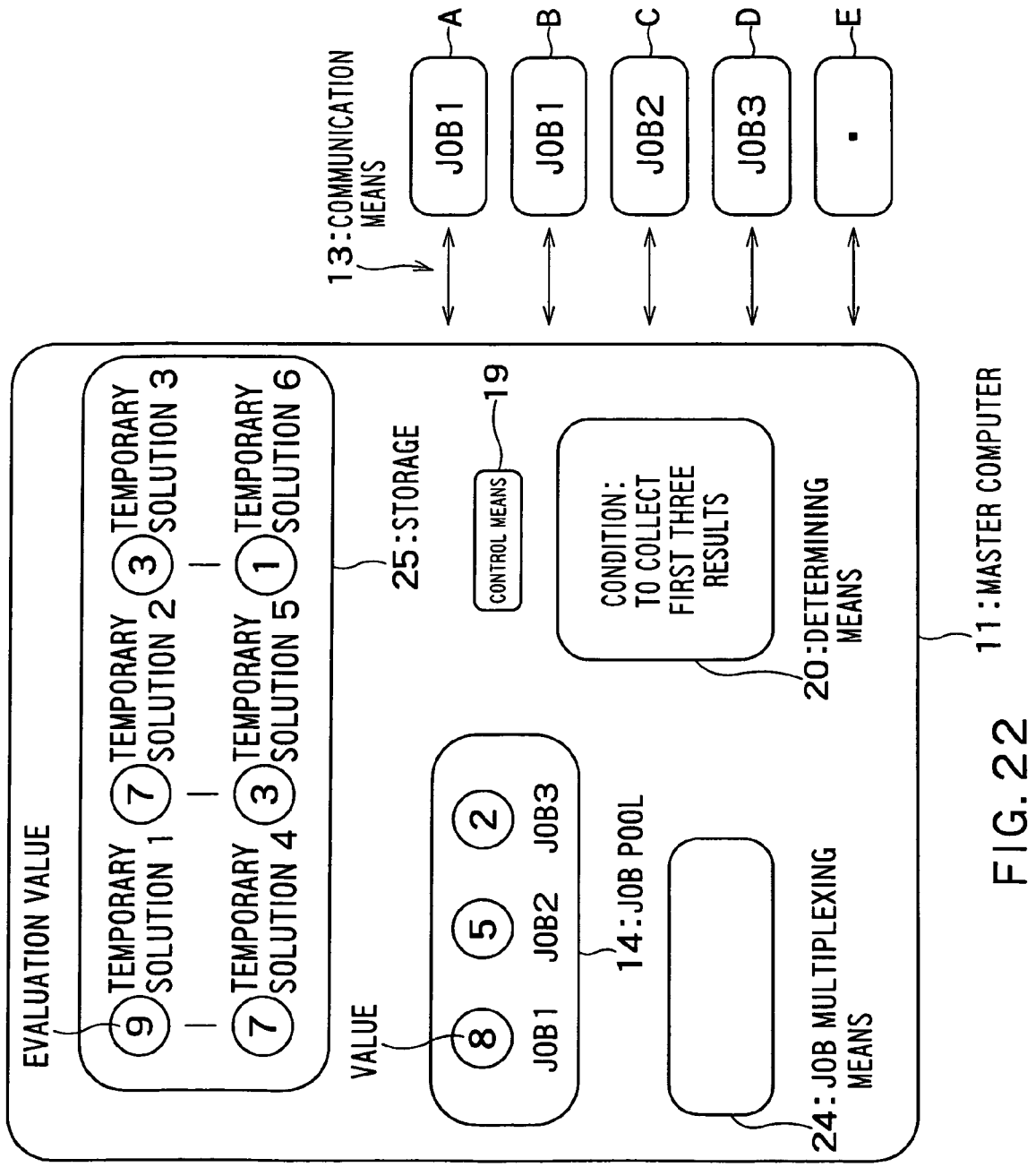
FIG. 22 is a diagram showing a state where the computer system of FIG. 20 executes calculation according to a genetic algorithm.

FIG. 22 is a diagram showing a state where calculation is executed in accordance with the genetic algorithm by the computer system of the embodiment.

It is now assumed that six temporary solutions 1 to 6 are obtained and the temporary solutions 1 to 6 are stored in a storage 25 in the master computer 11. The evaluation values of the temporary solutions are shown in circles.

In this state, candidates of a solution are generated. It is assumed here that candidates of a solution are generated from a pair of temporary solutions 1 and 4, a pair of temporary solutions 2 and 5, and a pair of temporary solutions 3 and 6.

The evaluations of the generated candidates of a solution are stored as jobs 1, 2, and 3 in the job pool 14. Each job has a value.

Generally, in the genetic algorithm, in many cases, a candidate of a solution generated from a good temporary solution has a good evaluation value and a candidate of a solution generated from a bad temporary solution has a bad evaluation value. Therefore, the average of evaluation values of parent solutions is computed as an index for evaluating the quality of candidates of a solution and is regarded as the value of the job.

The job multiplexing means 24 performs multiplexing the jobs 1 to 3 in accordance with the values of the jobs 1 to 3 in the job pool 14. It is assumed that the job having the highest value is duplicated and the other jobs are not multiplexed. Therefore, in the embodiment, the job 1 having the highest value "8" is duplicated and the other jobs 2 and 3 are not multiplexed.

The control means 19 assigns the jobs 1 to 3 in the job pool 14 to the workers A to D. The job 1 is duplexed and is processed by two workers A and B.

The determining means 20 determines whether collection of job results is finished or not. It is assumed here that the condition of collecting job results of the first three workers is given to the determining means 20. Assuming that, under the condition, the job results of the workers A, B, and D return before the job result of the worker C, that is, two execution results of the job 1 and one execution result of the job 3 return.

The control means 19 deletes one of the execution results of the job 1 and advances the process by using the remaining execution result of the job 1 and the execution result of the job 3. For example, in the case where the evaluation value of the new solution candidate as the execution result of the job 1 is larger than the temporary solution 1 or 4, the new solution candidate is left as a temporary solution, and the temporary solution 1 and/or the temporary solution 4 having an evaluation value lower than that of the new solution candidate are/is deleted. The process is similarly performed with respect to the execution result of the job 3.

The process is continued until the quality of the solution does not improve any more.

By advancing calculation by using only part of execution results of jobs, even when part of workers are heavily loaded and a reply of the result delays, the process can be advanced without delaying the whole process. Even if part of workers becomes defective, the whole process is not stopped. Since a candidate of a solution having high possibility to be a good solution is multiplexed and executed, the possibility of using the obtained solution in the next step can be increased.

As described above, according to the embodiment, a job having a high value is multiplexed and the process is executed. Consequently, also in the case of advancing the process with part of job results, the possibility of obtaining an effective result can be increased.

The embodiment can be combined with the first embodiment.

Figure 23:
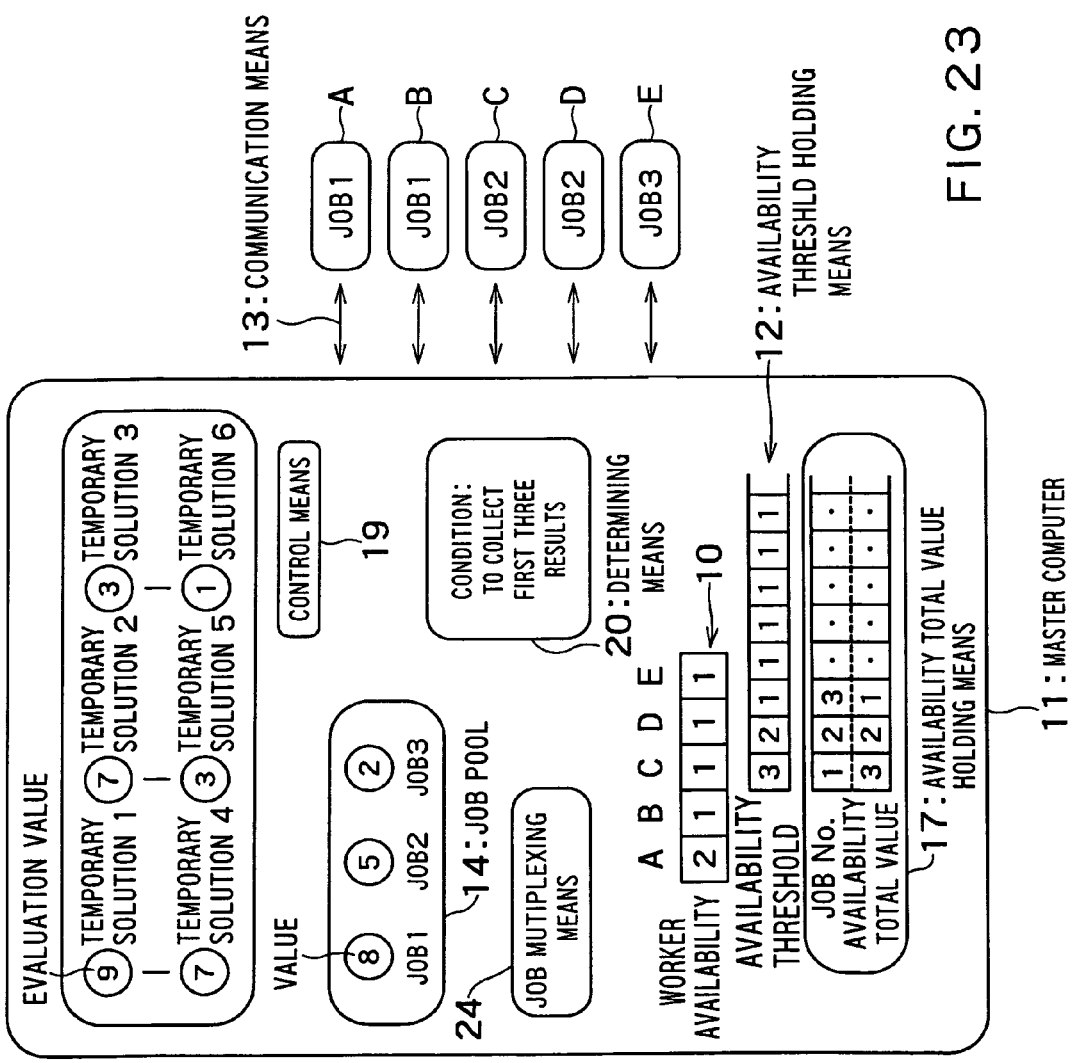
FIG. 23 shows a configuration example in which the computer system of FIG. 22 and the computer system of FIG. 1 are combined.

FIG. 23 is a diagram showing a configuration obtained by adding the worker availability holding means 10, availability threshold holding means 12, and availability total value holding means 17 of FIG. 1 to the computer system of FIG. 22. The job multiplexing means 24 makes a worker execute a job whose availability total value is less than the availability threshold.

The performance (for example, reliability) differs among the workers A to E. It is assumed that the reliability of the worker A is twice as high as that of the others. Consequently, the availability 2, 1, 1, 1, and 1 are stored in the worker availability holding means 10 in correspondence with the workers A to E, respectively.

The jobs 1 to 3 are stored in the job pool 14 and their values of the jobs 1, 2, and 3 are in decreasing order. Therefore, jobs are stored in the availability total value holding means 17 in order of jobs 1, 2, and 3 from the left of the diagram. The availability thresholds of the jobs 1, 2 and 3 are 3, 2, and 1, respectively. Each of the jobs 1 to 3 is assigned to a worker on the basis of the corresponding availability threshold and executed by the assigned worker.

For example, since the availability of the worker A is 2, the job 1 is executed by the two workers A and B, the job 2 is executed by the two workers C and D, and the job 3 is executed by one worker E.

When a predetermined collection condition is satisfied (for example, when the number of collected job results reaches a specified number), the determining means 20 determines to finish collection of job results.

The computer system of FIG. 23 has an advantage that it can use the workers more effectively as compared with the computer system of FIG. 22. Specifically, in the present example, there are an option of executing the job 1 by the worker A having availability of 2 and the worker B having availability of 1 and an option of executing the job 1 by the workers B, C, and D each having availability of 1. In contrast, in the configuration of FIG. 22 where the method of using the availability of workers is not employed, for example, even in a situation that the job 1 can be sufficiently executed by two workers A and B, it is assumed that all of the workers have the same reliability, and the job 1 has to be executed by the three workers A, B, and C.

What is claimed is:

1. A parallel computing method of performing parallel computing by using a master computer for generating a job, and plural worker computers, each having an assigned availability, which execute the job and return an execution result of the job to the master computer, wherein the master computer performs the steps of:
   generating plural jobs, each of the generated jobs having a value;
   storing the generated jobs into a job storage;
   calculating an availability threshold corresponding to each of the jobs in the job storage, the availability thresholds calculated according to an order of the values of the stored jobs, and each of the availability thresholds limiting multiplicity of the corresponding job;
   calculating, for each job in the job storage, an availability operation value based on the assigned availability of each of the worker computers that are executing each job;
   assigning, for each job in the job storage having an availability operation value less than the availability threshold, at least one available worker computer of the worker computers;
   receiving an execution result of one job of the jobs assigned in the assigning step from one worker computer which has completed execution of the one job among all worker computers executing the one job; and
   deleting the one job whose execution result has been received in the job storage.

2. The parallel computing method according to claim 1, wherein a group number is assigned to each of the worker computers and, in the case of assigning a same job to a plurality of worker computers, the master computer assigns the same job to worker computers having group numbers that are different from each other.

3. The parallel computing method according to claim 1, wherein the availability assigned to each worker computer is based on a reliability and a calculation power of the worker computer whose availability is being assigned.

4. The parallel computing method according to claim 1, wherein the master computer calculates the availability threshold for each job based on the value of the job whose availability threshold is being calculated.

5. The parallel computing method according to claim 1, wherein when the execution result of the one job of the jobs assigned in the assigning step has been received from the one worker computer which has completed execution of the one job the master computer indicates stopping of execution of the one job to another worker computer still executing the one job.

6. The parallel computing method according to claim 1, wherein the master computer has a table in which order and availability thresholds are associated with each other, and calculates the availability thresholds for each job in the job storage on the basis of the table according to the order of the values of the jobs in the job storage.

7. The parallel computing method according to claim 1, wherein for solving an optimization problem, calculation according to a branch and bound method is executed based on the master computer and the parallel computing of the worker computers.

8. The parallel computing method according to claim 1, wherein the jobs are executed according to a same algorithm, and in case where the number of collected execution results of execution of the jobs reaches a specified number, the master computer determines to finish collecting the results of execution of the jobs.

9. A computer-readable medium encoded with a parallel computing program that causes a master computer of a system performing parallel computing by using the master computer for generating a job and plural worker computers, each assigned an availability, to execute the job and return an execution result of the job to the master computer, to execute the steps of:
 generating plural jobs, each of the generated jobs having a value;
 storing the generated jobs into a job storage;
 calculating an availability threshold corresponding to each of the jobs in the job storage, the availability thresholds calculated according to an order of the values of the stored jobs, and each of the availability thresholds limiting multiplicity of the corresponding job;
 calculating, for each job in the job storage, an availability operation value based on the assigned availability of each of the worker computers that are executing the job;
 assigning, for each job in the job storage having an availability operation value less than the availability threshold, at least one available worker computer of the worker computers;
 receiving an execution result of one job of the jobs assigned in the assigning step from one worker computer which has completed execution of the one job among all worker computers executing the one job; and
 deleting the one job whose execution result has been received in the job storage.

10. A computer for assigning jobs to plural worker computers and receiving execution results of the jobs from the worker computers, comprising:
 a job generating unit generating plural jobs, each of the generated jobs having a value;
 a job storage unit storing the generated jobs;
 an availability threshold calculating unit calculating an availability threshold corresponding to each of the jobs in the job storage, the availability thresholds calculated according to an order of the values of the stored jobs, and each of the availability thresholds limiting multiplicity of the corresponding job;
 an availability storage storing an availability assigned to each of the worker computers;
 an availability operation value calculating unit calculating, for each job in the job storage, an availability operation value based on the assigned availability of each of worker computers that are executing the job; and
 a job management unit assigning, for each job in the job storage having an availability operation value less than the corresponding availability threshold, at least one available worker computer of the worker computers, and in case of receiving the execution result of one job of the jobs assigned in the assigning step from one worker computer which has completed execution of the one job among all worker computers executing the one job, deleting the one job whose execution result has been received from the job storage.

* * * * *